Feb. 28, 1961  E. P. FIRTH ET AL  2,973,070
ANTI-CREEP DEVICE
Filed Aug. 17, 1959  2 Sheets-Sheet 1

Inventors
EDWARD P. FIRTH AND
PAUL B. O'REILLY
By
Attorneys

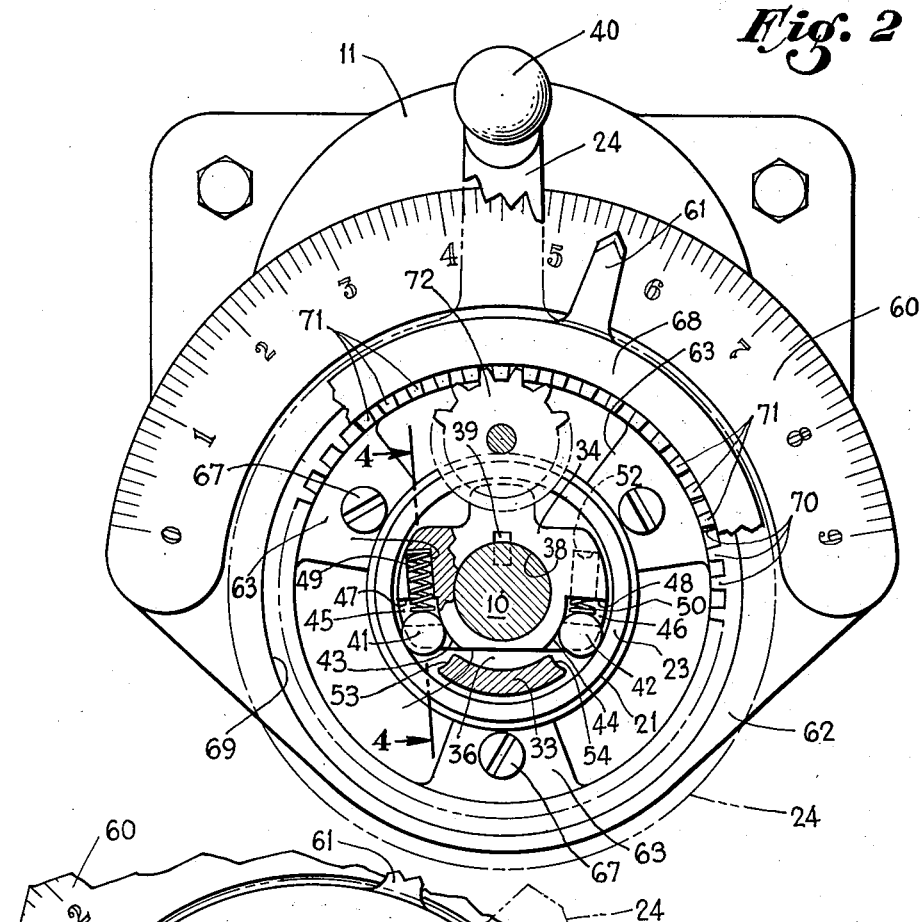
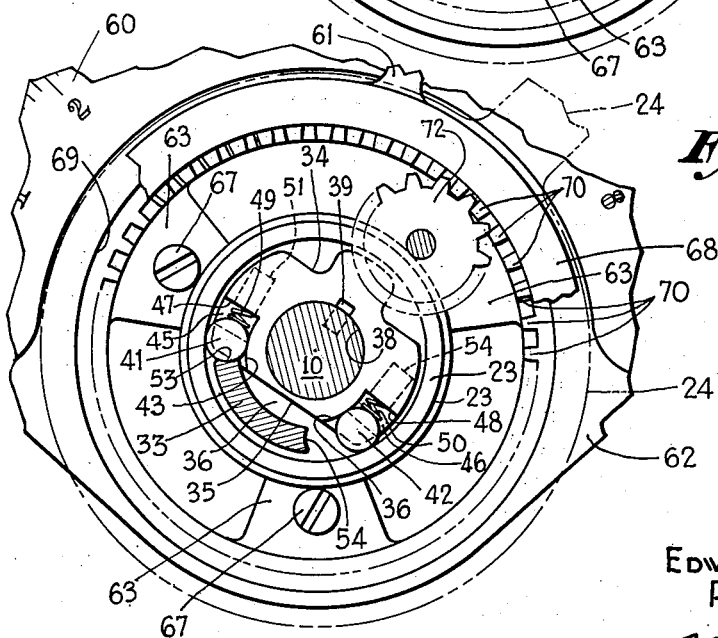

ated Feb. 28, 1961

2,973,070
ANTI-CREEP DEVICE

Edward P. Firth, La Mirada, and Paul B. O'Reilly, Pico-Rivera, Calif., assignors to U.S. Electrical Motors Inc., Los Angeles, Calif., a corporation of California Filed Aug. 17, 1959, Ser. No. 834,335

4 Claims. (Cl. 192—8)

This invention relates to a variable ratio transmission mechanism and more particularly to apparatus for releasably securing the adjustable structure of that transmission mechanism in a fixed position.

There is a tendency, due to vibration and other factors, for the adjusting shaft of a variable ratio transmission to creep. This means, of course, that the ratio of transmission slowly shifts from a desired value. There is, therefore, a need for an anti-creep device. Various locking devices can, of course, be provided. However, the most desirable device is one that is automatically released and applied, as the handle for the adjusting shaft is intentionally moved or stopped, respectively. Furthermore, it is desirable that the device be effective without requiring the exertion of any extra force through the handle, and without requiring any noticeably increased work to achieve adjustment.

The primary object of this invention is to provide an improved anti-creep device having the foregoing characteristics.

Another object of this invention is to provide a simple unit adapted to be accommodated upon the adjusting shaft and that contains in and of itself the necessary moving parts for releasably restraining movement of the shaft. A companion object of this invention is to provide apparatus of this character adapted to be mounted on an adjusting shaft that requires merely a cylindrical recess, as, for example, an end of a bearing cup, in which to fit, and a simple eccentric projection on the handle.

Another object of this invention is to make novel use of a bearing retainer or the like, to provide such cylindrical recess.

Another object of this invention is to provide an improved anti-creep device that incorporates a pair of locking elements for wedging engagement between relatively rotatable members.

Another object of this invention is to provide an anti-creep device of this character readily capable of assembly, particularly with respect to compression spring structures that must be moved to energy storing positions.

Another object of this invention is to provide a unitary cam assembly that includes means for supporting the wedging elements, whereby wear on the parts with respect to which the wedging elements move, is minimized.

Another object of this invention is to provide an improved structure of this character in which a bearing which supports the adjusting shaft serves effectively to align the anti-creep mechanism.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but is to be understood that this detailed description is not to be taken in a limiting sense, since the scope of this invention is best defined by the appended claims.

Referring to the drawings:

Fig. 2 is a transverse sectional view, taken along the offset plane indicated by line 2—2 of Fig. 1, a portion of the apparatus being broken away and illustrated in section, and parts of the apparatus in front of the section plane being shown in phantom lines.

Fig. 3 is a fragmentary view similar to Fig. 2, but illustrating the adjusting shaft in the process of adjustment, a drive being effective between the handle and the adjusting shaft by the aid of the anti-creep device.

Figure 1:
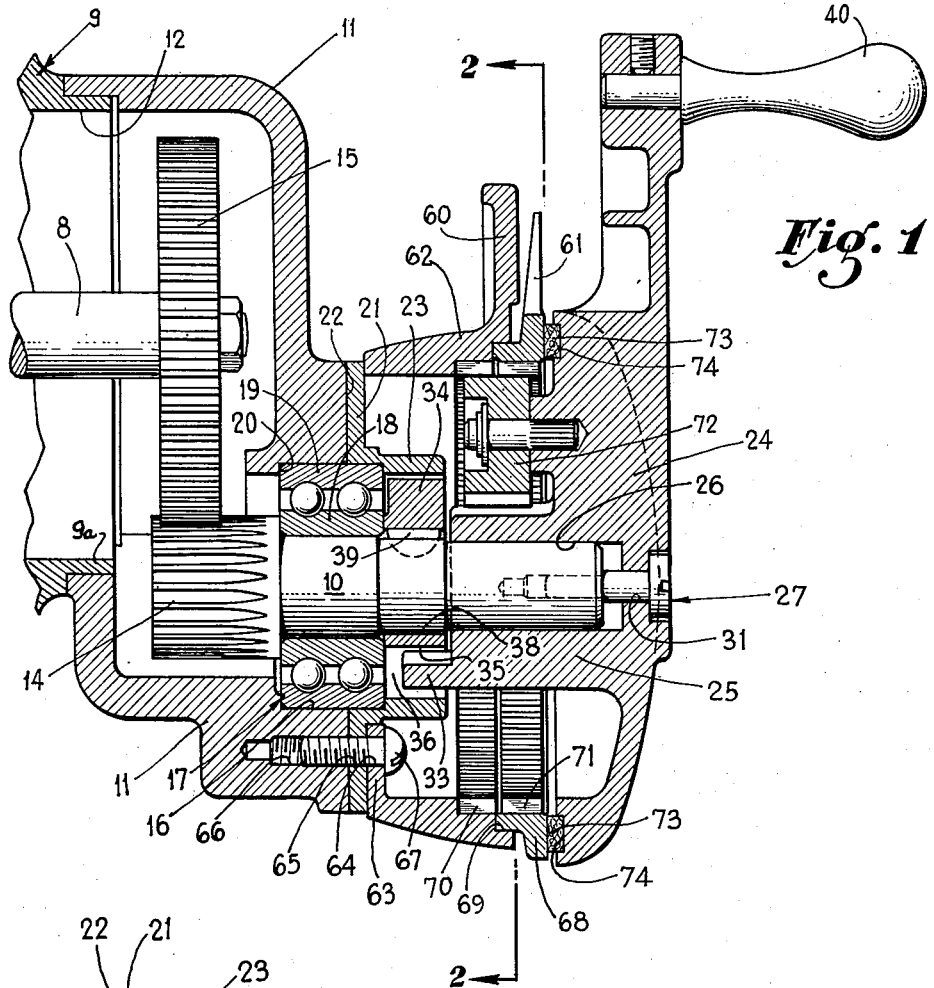
Figure 1 is an axial sectional view of an adjusting shaft mechanism incorporating the present invention, the apparatus that the shaft adjusts being accommodated in a housing, shown broken away.

In Fig. 1 there is illustrated a shaft 8 projecting through an opening 12 in a housing 9. A variable transmission in the housing 9 operates at a ratio set by rotating the shaft 8 to a given position. The shaft 8 projects into an end of a bracket 11 that fits around a cylindrical extension 9a of housing.

The bracket 11 mounts an adjusting shaft 10 in offset parallel relationship to the transmission shaft 8, and houses gears 14 and 15 respectively mounted upon the shafts 10 and 8 to effect a fixed reduction therebetween.

The adjusting shaft 10 projects outwardly through and substantially beyond an opening 16 at the right-hand end of the bracket 11 and it is supported thereat and intermediate its end by the aid of a ball bearing structure 17. The inner race 18 of the bearing 17 is fitted upon the shaft 10, and the outer race 19 fits against an annular shoulder 20 located inwardly of the opening 16.

An annular retainer 21 holds the bearing in place. The retainer 21 is placed against a flat face 22 of the bracket 11 surrounding the opening 16. This retainer 21 has a central sleeve or hub 23. The left-hand or base end of the sleeve 23 fits over the projecting end of the bearing race 19, there being a shoulder within the flange engaging the outer face of the bearing race 19. The outer end of the flange 23 provides a space in which the anti-creep device is accommodated, and in a manner presently to be described.

For rotating the adjusting shaft 10, a handle 24 is provided. The handle 24, which may be made of cast alloy of aluminum or the like, has a central hub 25 provided with a recess 26 receiving the outer end of the shaft 10. While the handle 24 might normally be coupled to the shaft 10, as by the aid of a key, it is merely journalled thereon. A shouldered screw 27, threaded with an end recess in the shaft 10 prevents axial separation of the handle 24. The screw 27 passes through an aperture 31 in the bottom of the recess 26, and its head, preferably flush with the outer surface of the handle, provides the actual restraint against separation.

The hub 25 of the handle 24 has a projection or nib 33, arcuate in form, and that projects into the cup formed by the bearing retainer flange or hub 23. This projection 33 serves to drive a cam 34 mounted upon the shaft 10, whereby a drive between the handle 24 and the adjusting shaft 10 is effected. The manner in which this is accomplished may best be appreciated by a consideration of Figs. 2 and 3 to which attention is now directed.

The cam 34, as shown in Fig. 2, is generally cylindrical, and fits with clearance within the flange 23. One side of the cam 34 terminates at a plane surface 35 parallel to the axis of the flange 23, to define in the cup a segmental space 36. The projection 33 extends with substantial clearance in this segmental space, and beneath the cam.

The cam 34 has a central aperture 38 whereby it is fitted upon the adjusting shaft 10. A key 39 couples the cam 34 to the shaft 10.

As the handle 24 (indicated in phantom lines in Figs. 2 and 3) is rotated, as by the aid of a knob 40 (Fig. 2), its projection 33 would move the cam member 34, and hence the adjusting shaft 10. However, locking pins 41 and 42 are respectively interposed between the cam 34 and the ends of the arcuate projection 33.

Figure 4:
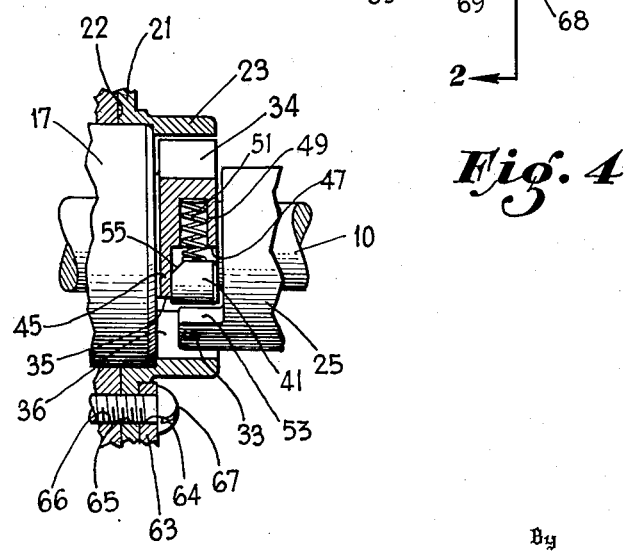
Fig. 4 is a detail sectional view, taken along a plane indicated by line 4—4 of Fig. 2.

Each locking pin is in the form of a cylinder (see also Fig. 4), the axis of which parallels that of the adjusting shaft 10.

The pins 41 and 42 are symmetrically oriented in peripheral arcuate recesses formed between the inner periphery of the flange 23 and arcuate walls or surfaces 43 and 44 of the cam member 34. The arcuate recesses open on the outer end surface of the cam member 34 whereby access is provided for assembly of the pins 41 and 42 in a manner to be hereinafter described. Flanges or lands 45 and 46 (see also Fig. 4) form bottoms for the grooves engaged by the corresponding ends of the pins 41 and 42. The recess at surface 43 opens at one end, at the segmental space 36 formed by the plane surface 35 of the cam 34. The other end of the recess at surface 43 is defined by a radial shoulder 47. The recess at surface 44 correspondingly and symmetrically extends between a shoulder 48 and the opposite side of the segmental space 36.

The surfaces 43 and 44 diverge from a circle centered at the axis of the device, and in a direction from the shoulders 47 and 48 toward the open ends of the respective grooves. At the shoulder ends, the spacing between the groove and the flange 23 exceeds the diameter of the pins 41 and 42, whereas the open ends, the spacing is less than the diameter of the pins 41 and 42. Thus at intermediate positions, the pins 41 and 42 are susceptible of wedging, between the flange 23 and the surfaces 43 and 44.

In wedging position, the locking pin 41 restrains the cam 34, and thereby the adjusting shaft 10, from movement in a clockwise direction as viewed in Fig. 2 because such movement tends toward further wedging. Correspondingly, the pin 42 restrains the cam 34, and thereby the adjusting shaft 10, from moving in a counterclockwise direction.

Compression springs 49 and 50, respectively, accommodated in rceesses 51 and 52 extending inwardly from the shoulders 47 and 48 serve normally to urge the pins 41 and 42 to wedging position.

If the pin 41 is first moved clockwise and away from wedging position, the cam 34, and thereby the adjusting shaft, can then be moved in a clockwise direction. The other pin 42 tends automatically to become unwedged. Since clockwise movement of the pin 41 releases the shaft 10 for corresponding angular movement, the handle 24 serves not only to release the locking pin 41, but also to effect angular movement of the car 34 and the shaft 10 in a clockwise direction. Correspondingly, counterclockwise movement of the handle 24 moves the adjusting shaft 10 in a counterclockwise direction.

The projection 33 thus concavely grooved end surfaces 53 and 54 adapted to fit the pins 41 and 42 and provide a substantial area for contact.

The springs 49 and 50 effect smooth transfer of rotating forces between the pins 41 and 42 and the cam 34. Thus, the springs 49 and 50 have sufficient spring constants such that they are capable of transmitting the necessary driving force without direction contact between the pins and their shoulders.

The cylindrical nature of the locking pins 41 and 42 ensures a substantial area of contact with the surfaces against which they are wedged. Localized wear is avoided and there is no tendency for grooves to form in the flange 23. The lands or rest shield the inner ends of the pins from rubbing contact with respect to any stationary part of the device. This minimizes wear.

Both surfaces 53 and 54 may simultaneously be spaced substantially from the corresponding pins 41 and 42, and as illustrated in Fig. 2. This ensures that the pins 41 and 42 may simultaneously be wedged. The substantial spacing allows for the possibility of the internal cylindrical surface of flange 23 being slightly oversized relative to the surfaces 43 and 44, or the pins 41 and 42 being slightly undersized, due to tolerances or wear. Thus, in such circumstances, the pins 41 and 42 tend to move closer to the projection 33. Until the handle 24 is moved to cause unseating of one of the wedged pins 41 or 42, the adjustment of shaft 8 is held against creeping. This is due to the oppositely acting wedging action of these pins.

The cam 34 serves conveniently as a mounting for the operative parts of the anti-creep device, facilitating assembly, replacement and repair. One manner in which assembly of the device may be accomplished is first to insert the shaft 10 and its bearing 17 into bracket 11. This bearing serves to center the cam housing or flange 23; and it effectively serves as a single support for the shaft. The bearing is purposely made with two spaced rows of balls. Next the cam 34, is placed into the housing or sleeve 23, with only the springs 49 and 50 in their recesses, and over the shaft 10, the key 39 then being installed. Finally, the pins 41 and 42 are positioned. Placement of the pins 41 and 42 requires pretensioning of the springs 49 and 50 to allow for insertion of the pins past the free ends of the springs. To avoid a tedious manipulation, each pin has a bevel, as at 55 (Fig. 4), formed on its inner end. The bevel 55 upon insertion of the pin, automatically causes retraction of the spring. To achieve this result, the pin is appropriately oriented so that the bevel 55 is addressed to the spring. Upon full insertion, the bevelled portion 55 clears the end of the spring 49. By the aid of the bevel 55, a special and separate manipulation of the spring 49 is avoided. The use of a special tool is not necessary.

A dial plate 60 cooperating with a pointer 61 (Figs. 1 and 2) serves as a means whereby the position of the adjusting shaft 10 is either ascertained or determined. The dial plate 60 is formed as an arcuate flange upon a hollow, open ended casting 62 aligned with the axis of the device. Its left-hand end, as shown in Fig. 1, abuts the outer margin of the bearing retainer 21. Integrally formed on the casting 62 are three ears 63 (see also Figs. 2 and 3) that serve as a means for securing the casting 62 as well as the bearing retainer 21 to the bracket 11. Each ear 63 (Fig. 1) has an aperture 64 aligned with an aperture 65 in the retainer ring 21 and with a threaded recess 66 at the bracket surface 22. Screws 67, passing through the apertures 64 and 65 and engaging the recess 66, secure the parts together.

The pointer 61 (Fig. 1) is formed on a ring 68, the left-hand end of which is received in a groove 69 formed about the right-hand opening of the casting 62 whereby the pointer 61 may be moved angularly along the dial plate 60. The casting 62 has interior teeth 70 forming a ring gear inwardly adjoining the recess 69. The ring 68 has interior teeth 71 forming a ring gear of the same pitch diameter. The teeth 70 and 71 of both gears are engaged by a freely rotatable planetary gear 72 that is mounted upon the inside of the handle 24. The number of teeth 70 formed differs slightly from the number of teeth 71, such as by one. The gear 72 is rotated about its own axis by teeth 70, and in turn, the gear 72 angularly proves the ring 68; and in a well known manner, a gear reduction is thus accomplished between the handle 24 and the pointer 61. Accordingly, the pointer moves over an arc of relatively limited extent over the entire range of adjustment.

A dust seal 73, accommodated in a groove 74, in the handle 24 spans the gap between the handle 24 and the ring gear 68 to protect the interior of the structure.

The inventors claim:
1. In combination: a casing having an opening; a bearing supported at the opening; a shaft projecting through the opening and supported by the bearing; a bearing retainer secured to the casing about the opening, and having a sleeve forming an interior cylindrical surface outwardly adjoining the bearing and through which said shaft projects; a cam member mounted on the shaft and located with clearance within the cylindrical surface; said cam member having a pair of angularly spaced peripherally located grooves opposed to said surface and forming wedge spaces therewith, the wedge spaces converging to a point fixed with respect to the cam and located between the wedge spaces; wedging pins in said spaces; compression springs carried by the cam member and urging the pins into wedging relationship with said surface; and a handle journalled upon the shaft, said handle forming with the casing at least part of an enclosure surrounding the sleeve; said handle having an eccentric projection located between said pins for optionally moving either pin out of wedging relationship and for driving the cam member.

2. In combination: a casing having an opening; a bearing supported at the opening; a shaft projecting through the opening and supported by the bearing; a bearing retainer secured to the casing about the opening, and having a sleeve forming an interior cylindrical surface outwardly adjoining the bearing and through which said shaft projects; a cam member mounted on the shaft and located with clearance within the cylindrical surface; said cam member having a pair of angularly spaced peripherally located grooves opposed to said surface and forming wedge spaces therewith, the wedge spaces converging to a point fixed with respect to the cam and located between the wedge spaces; wedging pins in said spaces; compression springs carried by the cam member and urging the pins into wedging relationship with said surface; and a handle journalled upon the shaft, said handle forming with the casing at least part of an enclosure surrounding the sleeve; said handle having an eccentric projection located between said pins for optionally moving either pin out of wedging relationship and for driving the cam member, said cam member having flanges interposed between the inner ends of the pins and said bearing.

3. In a device for maintaining the adjustment of a rotary shaft: means forming an interior cylindrical surface about the axis of the shaft; a cam member mounted on the shaft and located with clearance within the cylindrical surface; said cam member having a pair of angularly spaced peripherally located grooves opposed to said surface and forming wedge spaces therewith, the wedge spaces converging to a point fixed with respect to the cam and located between the wedge spaces; wedging pins in said spaces; compression springs carried by the cam member and urging the pins into wedging relationship with said surface; and a handle supported for movement about the axis of the shaft and having a projection means located between said pins for optionally moving either pin out of wedging relationship and for driving the cam member; said cam having flanges located at one end thereof to form rests for the ends of the pins holding them out of contact from adjoining structures.

4. In a device for maintaining the adjustment of a rotary shaft: means forming an interior cylindrical surface about the axis of the shaft; a cam member mounted on the shaft and located with clearance within the cylindrical surface; said cam member having a pair of angularly spaced peripherally located grooves opposed to said surface and forming wedge spaces therewith, the wedge spaces converging to a point fixed with respect to the cam and located between the wedge spaces; wedging pins in said spaces; compression springs carried by the cam member and urging the pins into wedging relationship with said surface; and a handle supported for movement about the axis of the shaft and having a projection means located between said pins for optionally moving either pin out of wedging relationship and for driving the cam member; said pins being bevelled for automatic retraction of the compression springs by insertion of the pins in the spaces.

References Cited in the file of this patent
UNITED STATES PATENTS

| | | |
|---|---|---|
| 1,626,197 | Hutton | Apr. 26, 1927 |
| 2,251,466 | Payson | Aug. 5, 1941 |
| 2,583,428 | Houplain | Jan. 22, 1952 |